United States Patent
Tsubaki

(10) Patent No.: US 7,060,903 B2
(45) Date of Patent: Jun. 13, 2006

(54) FEEDER ASSEMBLY

(75) Inventor: Akira Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/144,659

(22) Filed: Jun. 6, 2005

(65) Prior Publication Data

US 2006/0021782 A1 Feb. 2, 2006

(30) Foreign Application Priority Data

Jul. 30, 2004 (JP) .............................. 2004-222934

(51) Int. Cl.
*H02G 1/00* (2006.01)
(52) U.S. Cl. .................. 174/72 A; 174/70 R; 174/74 R
(58) Field of Classification Search .............. 174/72 A, 174/135, 70 R, 74 R; 49/360, 362 T
See application file for complete search history.

(56) References Cited

U.S. PATENT DOCUMENTS

| | | | |
|---|---|---|---|
| 6,009,671 A * | 1/2000 | Sasaki et al. ................. | 49/352 |
| 6,575,760 B1 | 6/2003 | Doshita et al. | |
| 6,700,064 B1 | 3/2004 | Aoki et al. | |
| 6,711,404 B1 | 3/2004 | Arpee et al. | |
| 2002/0005014 A1 * | 1/2002 | Doshita et al. ............... | 49/360 |
| 2004/0017648 A1 | 1/2004 | Tsubaki | |
| 2004/0108127 A1 | 6/2004 | Aoki et al. | |

FOREIGN PATENT DOCUMENTS

| | | |
|---|---|---|
| JP | 2001-354085 | 12/2001 |
| JP | 2002-79892 | 3/2002 |
| JP | 2004-112984 | 4/2004 |

* cited by examiner

*Primary Examiner*—Dean A. Reichard
*Assistant Examiner*—Jinhee Lee
(74) *Attorney, Agent, or Firm*—Armstrong, Kratz, Quintos, Hanson & Brooks, LLP

(57) ABSTRACT

The present invention is to provide a smooth swing of a wiring harness without interference when a moving structure, such as a sliding door, moves. A feeder assembly includes an inner member having a wiring harness fastener and a wiring harness outlet in succession to the harness fastener, and a case having a wide opening for inserting the wiring harness and receiving the inner member being pivoted freely. The case includes a space to receive excesses of the electric cables led out from the harness outlet of the inner member and a exit fastener to fix the electric cables at an exit side. Rotation axles are disposed in either the inner member or the case. Bearings are disposed in the other. An abutting portion for regulating the pivoting angle is disposed in either the inner member or the case and abutted portions are disposed in the other.

7 Claims, 5 Drawing Sheets

FEEDER ASSEMBLY

BACKGROUND OF THE INVENTION

1. Field of the Invention

The present invention relates to a feeder assembly for supplying electric power continuously to a sliding door of a vehicle and to the feeder assembly supporting pivotally a wiring harness.

2. Description of the Related Art

FIG. 9 shows an embodiment of a conventional feeder assembly (page 4, FIGS. 1 and 2 in JP,2002-79892,A).

The feeder assembly 51 is disposed in a vehicle body 52 and supports a wiring harness 54 connecting a sliding door 53 and the vehicle body 52 pivotally responding to open and close operations of the sliding door 53. The feeder assembly 51 includes a base 55 fixed to a step or a vicinity of the step of the vehicle body 52, and a harness supporter 56 connected to the base 55 to swing horizontally.

The harness supporter 56 has claws 57 to support a corrugated tube surrounding the wiring harness 54. The corrugated tube is made of a synthetic resin and has parallel and alternating ridges and grooves in the circumferential direction. The corrugated tube receives the wiring harness 54 for protecting a plurality of electric cables and the claws 57 engage with the grooves 58a of the corrugated tube.

Another feeder assembly (not shown) is arranged in the sliding door 53 (for example, JP,2001-354085, pages 7 to 9, FIG. 4 and FIG. 7). The feeder assembly inside the sliding door includes a semicircle protector made of a synthetic resin which receives the bent wiring harness 54, and a metal leaf spring to urge the wiring harness upwardly in the protector.

The protector has an elongated opening at a bottom and the wiring harness 54 is led out from the lower opening to a vehicle body and fixed to the feeder assembly 51 of the vehicle body. When the sliding door 53 is closed (shown by a solid line in FIG. 9), the wiring harness 54 is led out from rearward of the protector, and when the sliding door 53 is opened (shown by a chained line in FIG. 9), the wiring harness 54 is led out from forward of the protector. The leaf spring in the protector absorbs a slack of the wiring harness 54 when the sliding door is closed and opened, especially opened half.

As an feeder assembly inside the sliding door, JP,2004-112984,A discloses that a wiring harness is bent in from U-shape to J-shape to absorb the slack of the wiring harness.

The feeder assembly (not shown) does not utilize a leaf spring but absorbs a slack of the wiring harness by moving a slider forwardly and rearwardly inside the protector. The slider is connected to a circular arc protector between the sliding door and the vehicle body. The feeder assembly includes the circular arc protector and a fan shape protector of the vehicle body. The circular arc protector moves rotatably in the fan shape protector to receive the movement of the sliding door in the width direction of the vehicle when the door is opened and closed.

However, when the feeder assembly (FIG. 9) is disposed in the vehicle body 52, the swingable harness supporter 56 may interfere with other parts and structures, and be stepped by passengers. When the sliding door 53 is opened and closed, one end 54a of the wiring harness 54 extending outwardly from the harness supporter 56 to the vehicle body 52 swings so that the end 54a may interfere with other parts and structures. The harness supporter 56 is fixed to the vehicle body 52 by bolts and the wiring harness 54 is fixed by the harness supporter 56 so that the assembly becomes difficult and needs more man-hour. The feeder assembly 51 made of a metal is easy to rust and does not have a good appearance.

JP,2001-354085,A discloses that the feeder assembly 51 is disposed in the vehicle body. Then, it is also possible to dispose the feeder assembly 51 in the sliding door.

The feeder assembly 51 can also be disposed in a back door, trunk or hood besides the sliding door 53.

SUMMARY OF THE INVENTION

An object of the present invention is to provide a feeder assembly to swing a wiring harness according to a reciprocating movement of a moving structure, more specifically to provide the feeder assembly having an easy attachment and a good appearance without interference with other parts and passengers stepping.

According to a first aspect of the feeder assembly of the present invention, the feeder assembly includes an inner member having a harness fastener to fix a wiring harness and a harness outlet in succession to the harness fastener and a case having a wide opening to insert the wiring harness and receiving the inner member being pivoted freely.

The wiring harness is led into the case through the opening and fixed by the harness fastener of the inner member. The wiring harness is further led out from the harness outlet to outside of the case directly or through inside the case. Thereby, the wiring harness swings along the opening and the inner member pivots responding to the reciprocating movement of the moving structure such as a sliding door.

According to a second aspect of the feeder assembly of the present invention, the case includes a receiving space to receive excesses of electric cables led out from the harness outlet of the inner member, and an exit fastener to fix the electric cables at an exit side.

The excesses of the electric cables are received and wind between the inner member and the exit of the case responding to the pivoting movement of the inner member. Thereby, the excesses of the electric cables prevent a tension to the cables and the inner member can smoothly pivot. The electric cables are protected sefely without interference with other parts outside and passengers stepping.

According to a third aspect of the feeder assembly of the present invention, rotation axles are disposed in either the inner member or the case, and bearings for the rotation axles are disposed in the other.

Thereby, the rotation axles engage rotatably with the bearings and the inner member is correctly positioned to inside the case so that the inner member can pivot smoothly with respect to the rotation axles.

According to a fourth aspect of the feeder assembly of the present invention, an abutting portion to regulate a pivoting angle is disposed in either the inner member or the case, and an abutted portion for the abutting portion is disposed in the other.

When the inner member pivots, the abutting portion of the inner member abuts to the abutted portion of the case and stops the further movement. The abutted portions are disposed at both sides in the pivoting directions and the pivoting angle is regulated. Thereby, the wiring harness can swing smoothly in a limited area so that the wiring harness is prevented from a large change of the shape or unreturnable accident due to the excess pivoting of the inner member. A protrusion can be utilized as the abutting portion and both ends of a circular arc groove can be utilized as the abutted portions.

According to a fifth aspect of the feeder assembly of the present invention, a guide for the abutting portion is disposed in either the inner member or the case, and the abutted portions are positioned at both sides of the guide.

Thereby, the abutting portion is guided by the guide and the inner member can smoothly pivot. Since the inner member is securely supported at two points by the rotation axles and the abutting portion in the case, the inner member has high attachment strength for the tension or suppression of the wiring harness.

According to a sixth aspect of the feeder assembly of the present invention, the harness fastener of the inner member includes fastener protrusions to engage with a protector tube of the wiring harness.

Thereby, the protector tube is easily and assuredly fixed by the harness fastener. When the corrugated tube is utilized as the protector tube, the fastener protrusions engage with grooves of the corrugated tube.

The protector tube protects the electric cables between the moving structure, such as the sliding door, and the case not to scrape with the outside parts or the opening of the case.

According to a seventh aspect of the feeder assembly of the present invention, the harness outlet of the inner member includes tapered walls for regulating swing angle of the electric cables of the wiring harness.

When the electric cables of the wiring harness wind, the tapered walls prohibit the larger movement of the cables over the walls and regulate the outlet direction of the cables. Thereby, it is prevented the electric cables from bending excessively and the outlet direction of the cables is secured.

According to a eighth aspect of the feeder assembly of the present invention, the wiring harness is led out from a feeder assembly of a moving structure and led into the case through the opening.

Thereby, when the moving structure such as the sliding door is closed and opened, the wiring harness and the inner member inside the case of the feeder assembly of the vehicle body swing together so as to feed continuously electric power from the vehicle body to the sliding door with the wiring harness.

DETAILED DESCRIPTION OF THE PREFERRED EMBODIMENTS

Figure 1:
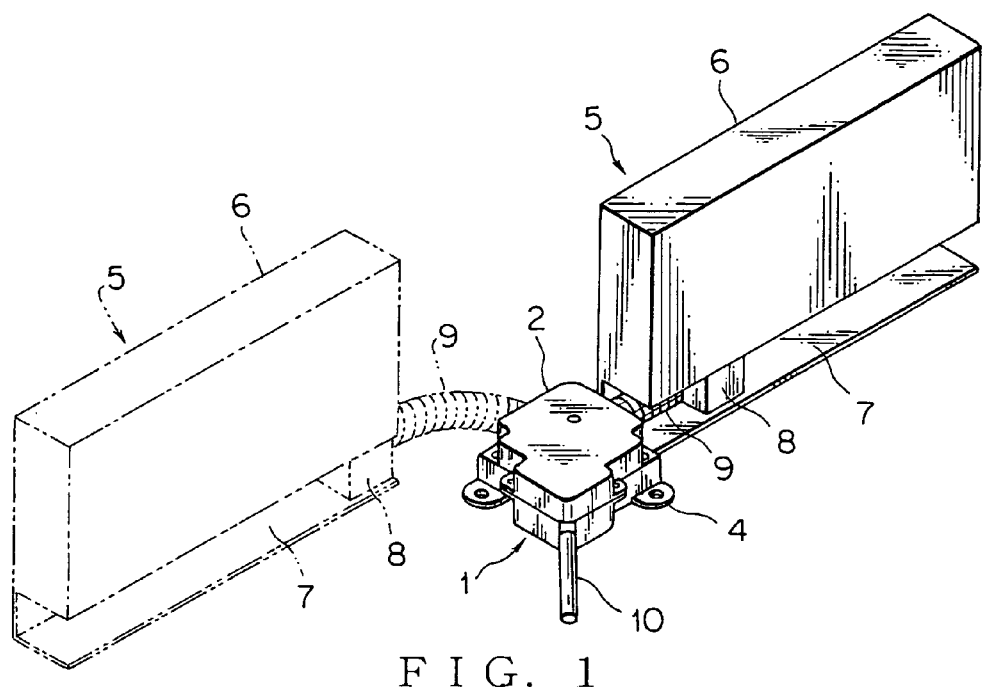
FIG. 1 is a perspective view showing an embodiment of a feeder assembly according to the present invention.
Figure 2A:
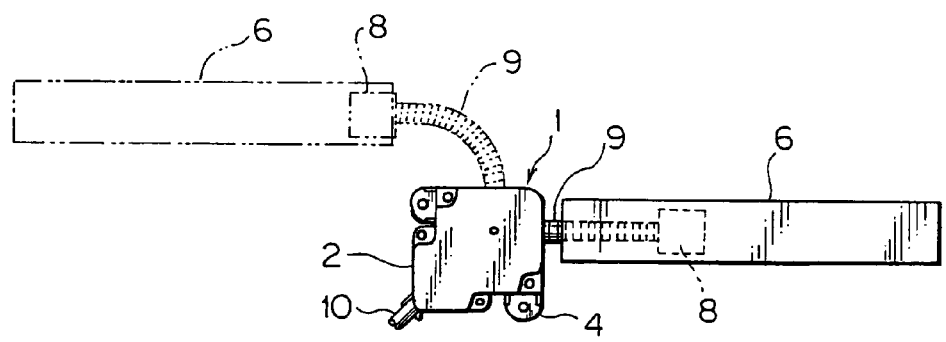
FIG. 2A is a plan view showing an operation of the feeder assembly.
Figure 2B:
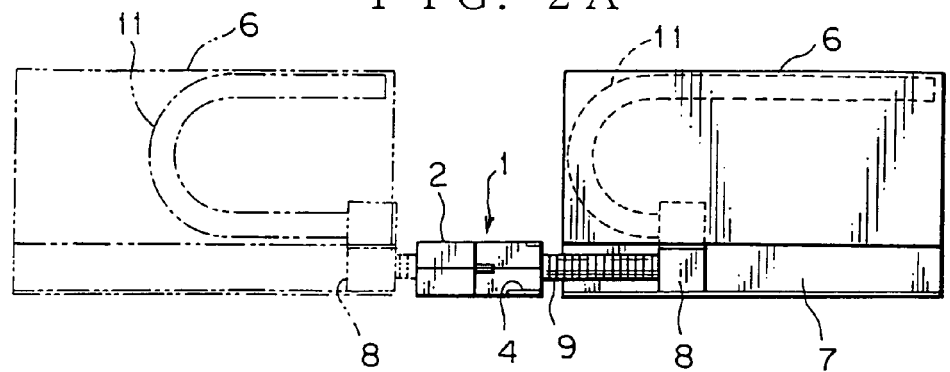
FIG. 2B is a front view showing the operation of the feeder assembly.

FIGS. 1 and 2 show an embodiment utilizing a feeder assembly according to the present invention.

The feeder assembly 1 of the present invention is placed horizontally in a vehicle body and includes a case 2 and a pivotable inner member 3 (FIG. 3) attached to the case. Both the case 2 and the inner member 3 are made of synthetic resins.

The feeder assembly 1 is fixed by bolts in brackets 4 to a step or a vicinity of the step of the vehicle body. A door-side feeder assembly 5 has a rectangular shaped protector 6 placed vertically in a sliding door and a wiring harness 11 is received in the protector 6 in U-shape or J-shape. A wiring harness 9 is led out from a slider 8 in a lower opening 7 of the protector 6 to the feeder assembly 1 of the vehicle body of the present invention.

The wiring harness 9 from the slider 8 to the feeder assembly 1 is covered by a corrugated tube. The wiring harness 9 covered by the corrugated tube is led into one side of the feeder assembly 1 and electric cables 10 are led out from the other side thereof without the corrugated tube. The electric cables 10 are wired to a battery or auxiliary units of the vehicle body.

The electric cables (not shown) led out from the door-side feeder assembly 5 are connected to the auxiliary units such as power window motors, door locks, speakers and switches.

In FIGS. 1 and 2, a solid and chained lines show that the sliding door is closed and opened, respectively. The door-side feeder assembly 5 is only an example and other feeder assemblies such as described in JP,2001-354085,A (page 7–9, FIGS. 4 and 7) and JP,2004-112984,A (page 4, FIG. 1), and reel type are also utilized.

Figure 4:
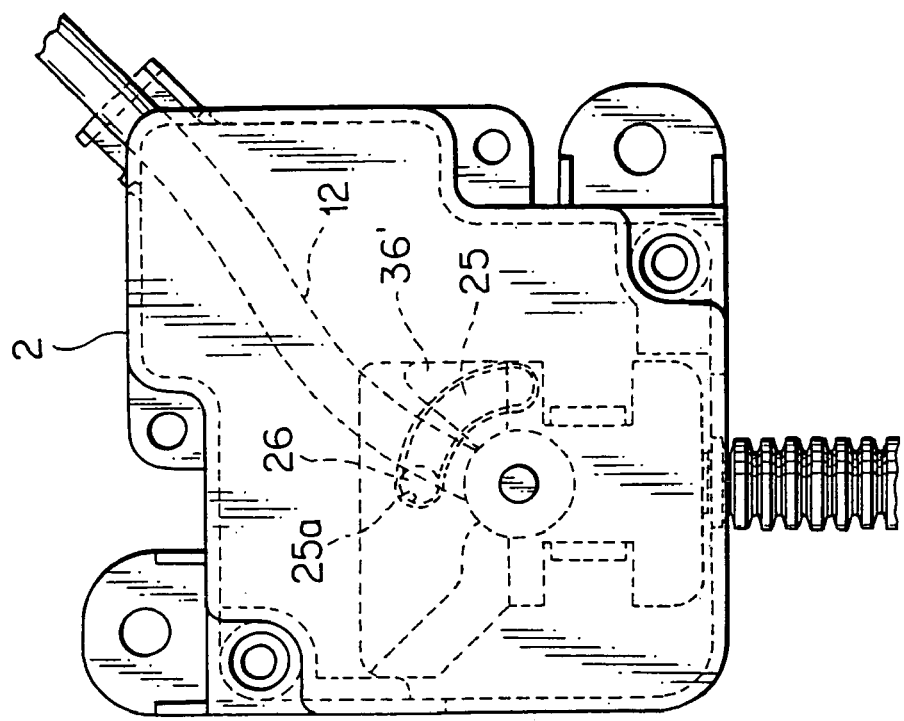
FIG. 4 is a plan view showing the pivoted feeder assembly.
Figure 3:
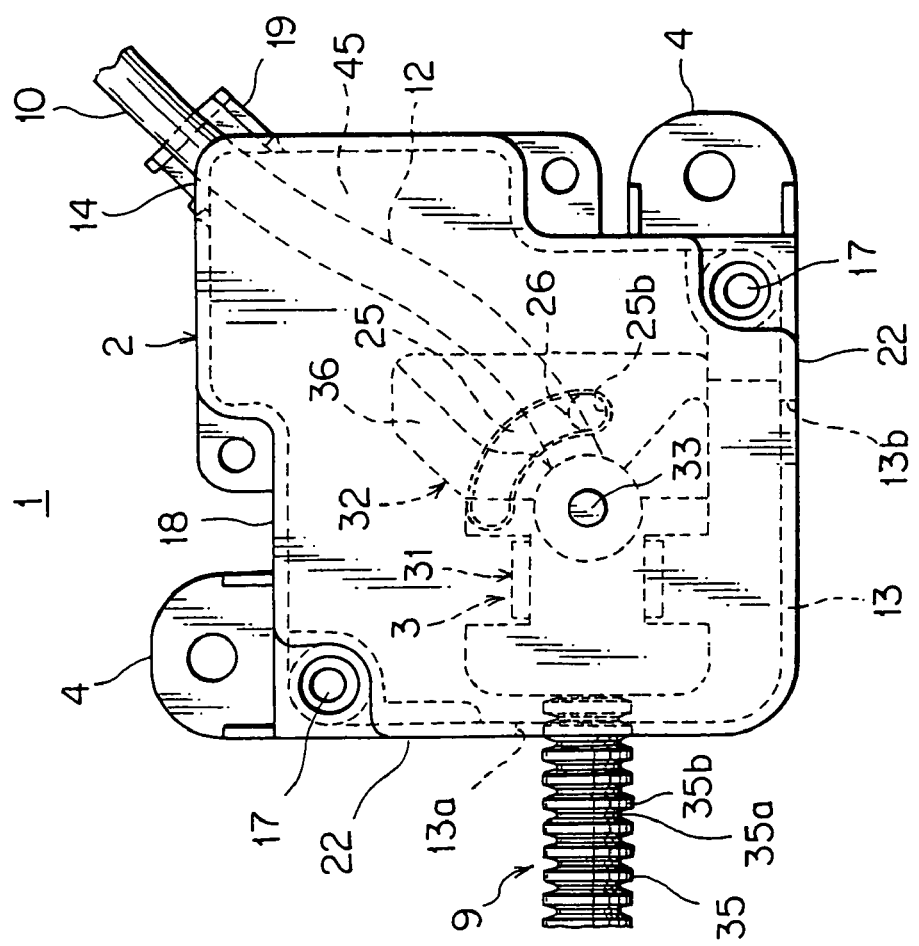
FIG. 3 is a plan view showing an embodiment of a feeder assembly of the present invention.
Figure 5:
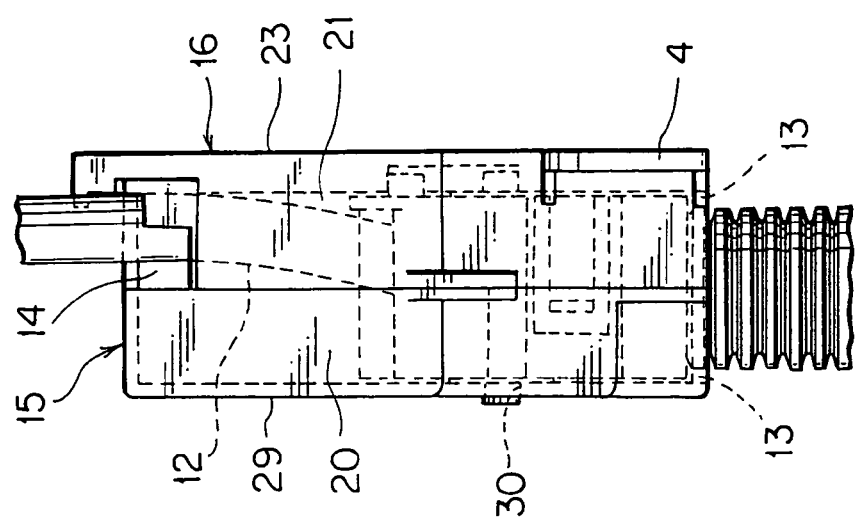
FIG. 5 is a side view showing the feeder assembly.

FIGS. 3 to 5 show a detail of the embodiment of the feeder assembly according to the present invention. FIG. 3 shows the sliding door fully closed. FIGS. 4 and 5 show a plan view and side view of the sliding door fully opened, respectively.

In FIGS. 3 and 4, the inner member 3 in the case 2 is pivotable about 90 degrees at one half of the case 2. Responding to the pivotable movement of the inner member 3, electric cables 12 led out from the inner member 3 moves horizontally and windingly in the other half 45 (receiving space) of the case 2 with the excesses. The electric cables 12 have the excesses so that the inner member 3 can smoothly pivot although the electric cables 12 are fixed at an exit 14 of the case 2. The inner member 3 and the electric cables 12 therefrom are safely received in the case 2 without interference with an outside.

The case 2 includes an upper case 15 and a lower case (base) 16 both of which are joined at a middle position of the height of the case 2 and fixed by bolts or tap screws through holes 17. When the bolts are utilized, nuts are disposed in the lower case 16. Both cases 15 and 16 can be fixed together by a locking means such as locking projections and engaging frame pieces.

The case 2 is formed in generally square and is symmetrical with respect to a diagonal line. The brackets 4 are disposed in recesses 18 outside the lower case 16 and extend outwardly and horizontally to be fixed to the vehicle body so that the case 2 can be made smaller.

An inlet (opening) 13 and outlet (exit) 14 of the wiring harness are disposed on the diagonal line of the case 2. The inlet 13 is formed widely in a horizontal direction and the outlet 14 formed narrowly. An exit fastener 19 with a plate shape is disposed at the outlet 14 for banding the electric cables 12 of the wiring harness 9 to fix. The distinction of the inlet 13 and the outlet 14 is only for illustrative convenience. Walls 20 and 21 define an inner space of the case 2.

Figure 6:
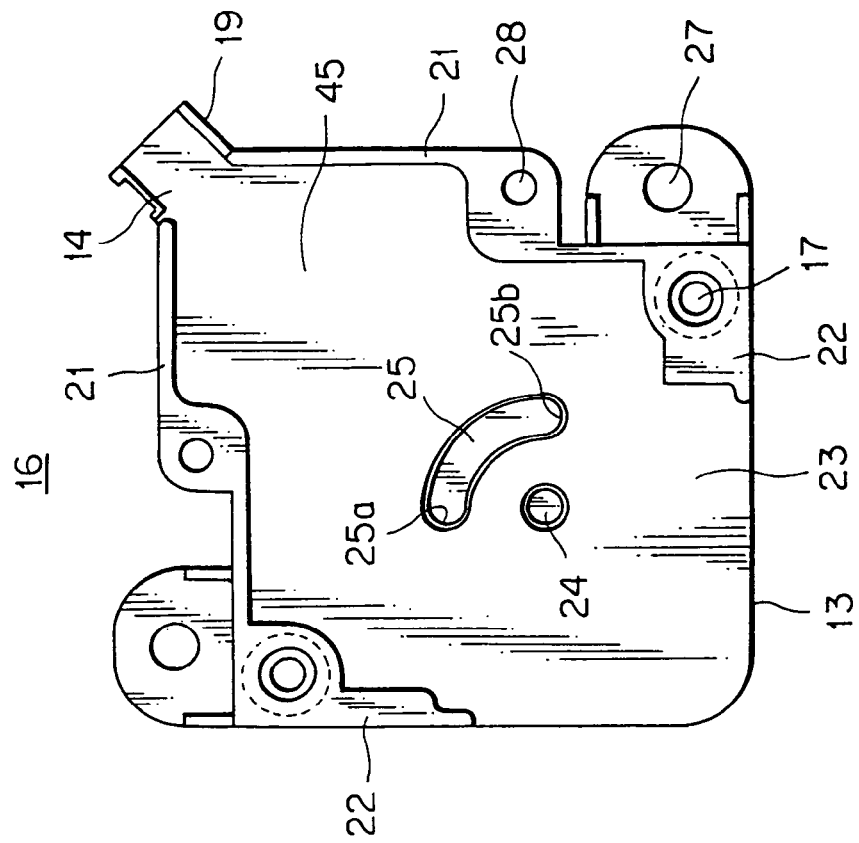
FIG. 6 is a plan view showing a case of the feeder assembly.

FIG. 6 shows the lower case 16 only. The walls 21 and walls 22 are upstanding from adjacent edges close to the outlet 14 and from adjacent edges close to the inlet 13, respectively. A cutout of the inlet 13 at each side extends to a half or more than half length of the side and the cutout at each side intersects to each other.

A circular bearing hole (bearing) 24 to support pivotally the inner member 3 is disposed in a position close to the inlet 13 with respect to the center of a bottom wall 23 of the lower case 16. A circular-arc guide groove (guide) 25 to regulate a rotation angle (pivoting angle) of the inner member 3 is disposed in the center of the bottom wall 23 and positioned close to the outlet 14 with respect to the bearing 24. Both the bearing hole 24 and guide groove 25 are not formed through the bottom wall 23 but formed in recesses and arranged in proximate to each other. Both end faces 25a and 25b of the guide groove 25 function as abutted portions for a protrusion (abutting portion) 26 of the inner member 3 described below.

The lower case 16 includes the holes 17 to fix to the upper case 15 and body fixing holes 27 and 28 to fix to the vehicle body, at thick portions of the walls 21 and 22. The exit fastener 19 of the outlet 14 is flush with the bottom wall 23. The inlet 13, the bearing hole 24, the guide groove 25 and the outlet 14 are arranged on the diagonal line of the lower case 16. A wide receiving space is formed between the inlet 13 and the outlet 14. Numeral 45 shows the space in which the electric cables 12 wind.

The single figure of the upper case 15 is not given. As seen in FIG. 5, the upper case 15 also includes the wall 20 with almost same height of the lower case 16, a horizontal upper wall 29 opposing to the bottom wall 23, an upper case inlet 13 with a similar shape as that of the lower case 16, and a through bearing hole 30 in the upper wall 29 opposing to the bearing hole 24 of the bottom wall 23. The outlet 14 is not disposed in the diagonal line of the upper case 15 but is covered by the wall 20 under which the outlet 14 of the lower case 16 is arranged. The upper case 15 does not include the guide groove 25.

Figure 7A:
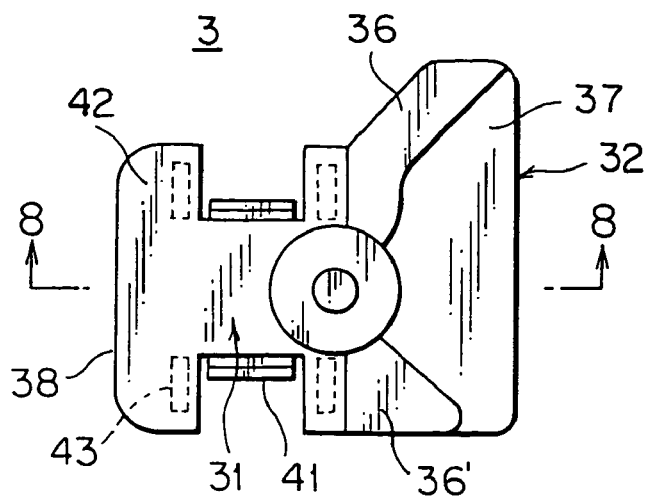
FIG. 7A is a plan view showing an inner member of the feeder assembly.
Figure 7B:
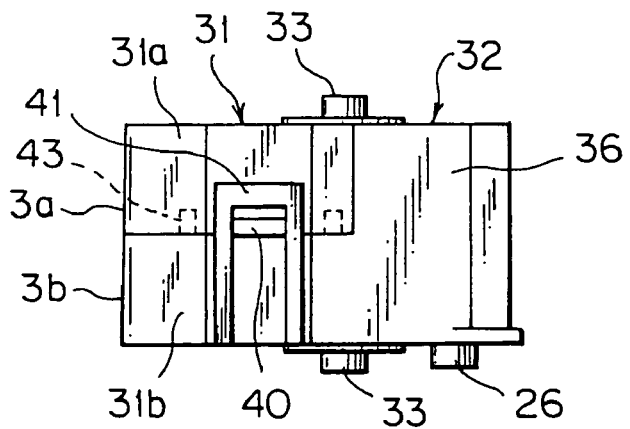
FIG. 7B is a side view showing the inner member of the feeder assembly.
Figure 8:
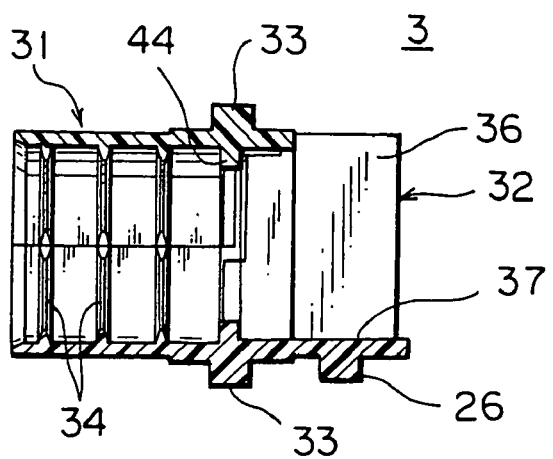
FIG. 8 is a sectional view taken along the line 8—8 in FIG. 7A.
Figure 9:
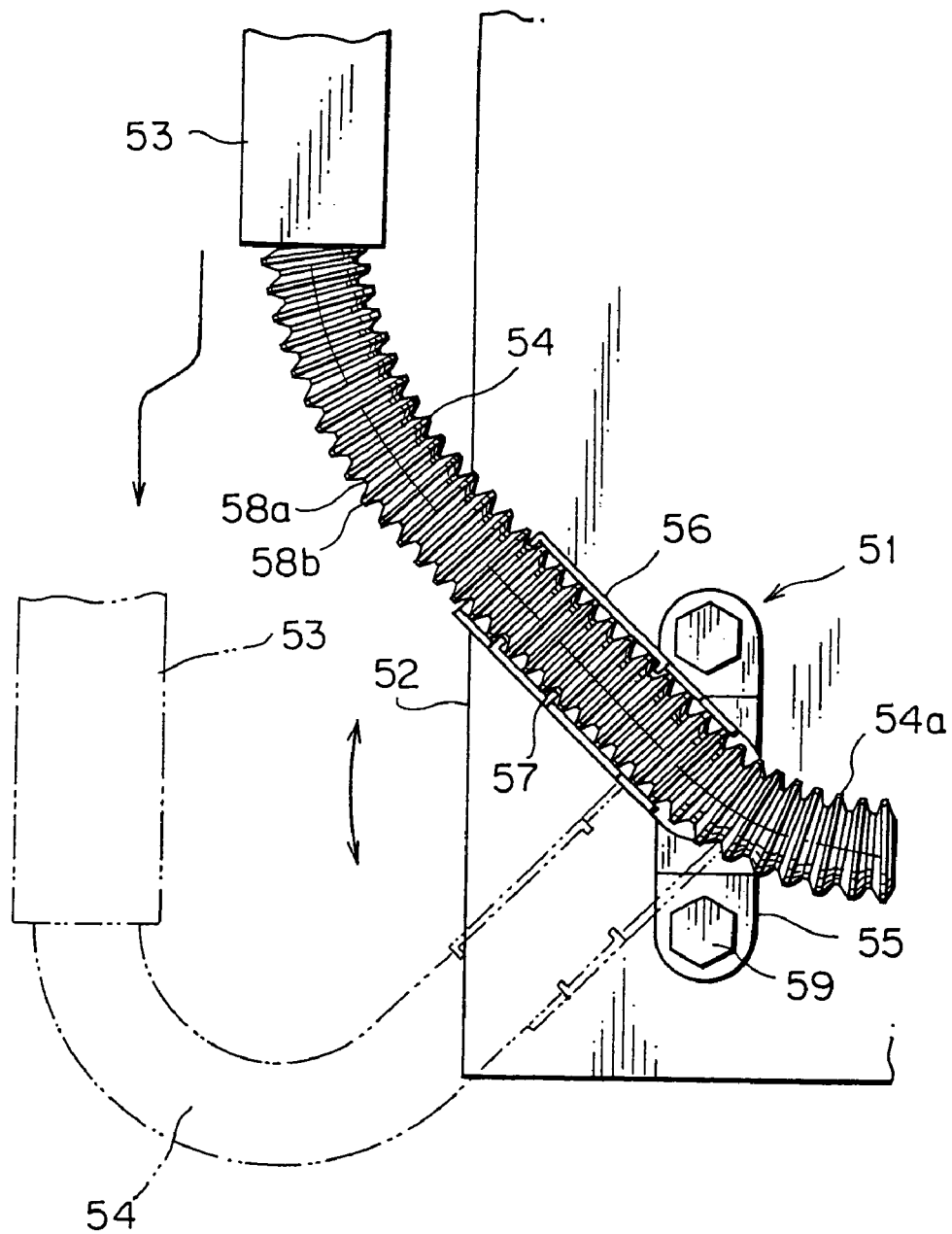
FIG. 9 is a plan view showing an embodiment of a conventional feeder assembly.

FIGS. 7A, 7B and 8 show the inner member 3. The inner member 3 includes a ring-shaped wiring harness fastener 31 with oval section, a wiring harness outlet 32 extended in fan shape, a pair of rotation axles 33 disposed on upper and lower surfaces of the inner member 3, and the protrusion (abutting portion) 26 under the harness outlet 32 to regulate the rotation angle. Both the rotation axles 33 and the protrusion 26 are formed in cylindrical and have a same shape.

The harness fastener 31 includes a plurality of ribs (fastener protrusions) 34 inside the harness fastener 31 along the axial direction and the ribs 34 are equally spaced along the axial direction. The ribs 34 engage with the grooves 35a of the corrugated tube 35 (FIG. 3) of the wiring harness 9 to fix in the circumferential and axial directions. The corrugated tube 35 has oval section and the major axis is vertical and the minor axis is horizontal.

The harness outlet 32 is defined by tapered walls 36 and 36' extending tapered to the right and left sides and a fan shape bottom wall 37 connecting both the tapered walls 36 and 36'. The harness outlet 32 provides a winding space for the wiring harness 9. The tapered walls 36 and 36' function to regulate the swing angle for the wiring harness 9.

The inner member 3 is divided into an upper portion 3a and lower portion 3b. The upper portion 3a includes a divided fastener 31a with semi oval section and the rotation axle 33 disposed on the divided fastener 31a. The lower portion 3b includes a divided fastener 31b with semi oval section and the harness outlet 32 integrated to the divided fastener 31b.

The upper and lower portions 3a and 3b are fixed together by means of a locking means having a locking projection 40 and a flexible engaging frame piece 41 disposed around walls of the divided fasteners 31a and 31b. The upper and lower portions 3a and 3b each have rectangle protrusions 42 at both sides of the locking means and the protrusions extend outwardly to right and left sides. Recesses in the protrusions 42 of either the upper or lower portions 3a and 3b are fitted with projections 43 of the other portion and the both portions 3a and 3b are positioned to each other for each rib 34 inside the upper and lower portions to mate together.

A thick ring rib 44 is arranged under the upper and lower rotation axles 33 and adjacent to a back end of the ribs 34. to hold the wiring harness. An inner diameter of the rib 44 is smaller than that of the rib 34. The electric cables 12 without the corrugated tube 35 are inserted into the rib 44. The rib 44 effects a stopper for an end face of the corrugated tube 35 and is disposed separately into the upper and lower portions 3a and 3b similarly to the rib 34 of the harness holder 31.

As shown in FIGS. 3 to 5, the corrugated tube 35 extends to the rib 44 and the electric cables 12 without the corrugated tube 35 pass through the ring rib 44. The electric cables 12 are formed with a plurality of electric wires. The electric cables 12 are led out from the fan shape space of the harness outlet 32, passing over the bottom wall 23 of the case 2, through the outlet 14 to outside (the vehicle body). The electric cables 12 may be bound by a tape.

When the sliding door is fully closed, as in FIG. 3, the corrugated tube 35 of the wiring harness 9 is positioned to one end portion 13a of the inlet 13 and perpendicularly to the wall 22. The inner member 3 holding the corrugated tube 35 positions parallel to the wall 22 at the other end portion 13b of the inlet 13 of the case 2. The abutting portion 26 of the inner member 3 abuts to the end face 25b (near to the other end portion 13b of the inlet 13) of the guide groove 25 of the case 2.

The electric cables 12 led out from the harness fastener 31 come close or contact to the wall 36 and are arranged in S-shape between the back end of the harness fastener 31 and the outlet 14 of the case 2.

When the sliding door is fully opened, as shown in FIG. 4, from the fully closed state as shown in FIG. 3, the corrugated tube 35 swings along the inlet 13 toward the other portion 13b and the inner member 3 rotates in the counterclockwise direction inside the case 2. The inner member 3 and the corrugated tube 35 are positioned to parallel with the wall 22 of the end portion 13a and the abutting portion 26 is positioned to the other end face 25a of the guide groove 25.

The electric cables 12 of the wiring harness 9 wind and come close or contact to the other wall 36' of the harness outlet 32 and are bent in reversed S-shape, symmetric to the S-shape in FIG. 3, between the harness fastener 31 and the outlet 14 of the case 2.

When the sliding door is moved from the fully opened state (FIG. 4) to the fully closed state (FIG. 3), the corrugated tube 35 and the inner member 3 pivot reversely and the electric cables wind reversely compared to the above operation, respectively.

In the above embodiment, the pivoting angle of the inner member 3 is set to about 90 degrees but is not limited to 90 degrees and possible to set more or less than 90 degrees corresponding to a stroke of the sliding door closed and opened. The pivoting angle is set by a length of the circular-arc guide groove 25. An angle between the walls 36 and 36' of the harness outlet 32 is also changed in according with the change of the pivoting angle.

The circular-arc guide groove 25 can be replaced by a through hole guide. The circular-arc rib or the right and left stoppers abutting to the protrusion 26 can be disposed on the bottom wall 23 of the case 2. The protrusion 26 can be formed on the bottom wall 23, and the guide groove 25 and the related parts can be formed in the inner member 3. It is also possible to form the guide groove 25 and the protrusion 26 in the upper wall 29 and bottom wall 23, respectively.

It is also appreciated that the rotation axles 33 are disposed on the bottom wall 23 and upper wall 29 of the case 2 instead of the inner member 3 and that the bearing holes 24 are disposed on upper and lower faces of the inner member 3 instead of the case 2. It is also appreciated that the detailed structure of the inner member 3, such as the locking means 40 and 41 and the projections 43, is optionally defined as far as the inner member 3 includes the harness fastener 31 and the harness outlet 32. The inner member 3 can be divided into right and left sides instead of upper and lower portions. In this case, one portion 3a of the both side portions includes the harness outlet 32.

It is appreciated that the case 2 made of a synthetic resin includes a plate base and a rectangular box-shaped upper case instead of splitting the case 2 into two parts in the height direction. The shape of the case 2 is not limited to rectangular but may have a fan shape by forming the inlet 13 into circular-arc. The space receiving the electric cables 12 of the wiring harness 9 may be formed in a narrow rectangular tube for allowing the winding of the electric cables 12.

It is also appreciated that the space receiving the electric cables 12 of the wiring harness 9 is removed to dispose the electric cables 12 outside and the end of the cables 12 is, for example, fixed to the vehicle body by a cramp. In this case, it is necessary to arrange the electric cables 12 and parts protecting the electric cables 12 to avoid interference with the vehicle body.

The corrugated tube 35 of the embodiment is flexible and has the oval cross-section to slim the door-side feeder assembly 6. The cross-section can be circular. In this case, the cross-section of the harness fastener 31 becomes circular instead of the oval shape. The corrugated tube with circular cross-section can rotate freely along the ribs 34 of the harness fastener 32.

A net-type tube made of a synthetic resin can be utilized instead of the corrugated tube 35. A protector tube can be fixed by sticking sharp projections (not shown) extending inwardly at the inner member or fixed to the inner member by an adhesive. The plurality of electric cables can be fixed directly by the separated type inner member 3 or fixed after binding the cables with a tape without using the corrugated tube 36 or net-type tube.

The feeder assembly 1 of the present invention can be placed vertically (vertical set) instead of the horizontal set and adapted to a moving structure, such as a back door, trunk, hood, except the sliding door. The above mentioned structure is also applied to a harness layout structure having the feeder assembly.

What is claimed is:

1. A feeder assembly comprising:
    an inner member having a harness fastener to fix a wiring harness and a harness outlet in succession to the harness fastener; and
    a case having a wide opening to insert the wiring harness and receiving the inner member being pivoted freely
    wherein rotation axles are disposed in either the inner member or the case, and bearings for the rotation axles are disposed in the other, wherein the case includes an exit fastener having a plate shape disposed at an exit of the case for banding the wire harness, and wherein the inner member includes at least one locking means disposed on the harness fastener.

2. The feeder assembly as claimed in claim 1, wherein said case includes a receiving space to receive excesses of electric cables led out from the harness outlet of the inner member, and the exit fastener to fix the electric cables at the exit side.

3. The feeder assembly as claimed in claim 1, wherein an abutting portion to regulate a pivoting angle is disposed in either the inner member or the case, and abutted portions for abutment are disposed in the other.

4. The feeder assembly as claimed in claim 3, wherein a guide for the abutting portion is disposed in either the inner member or the case, and the abutted portions are positioned at both sides of the guide.

5. The feeder assembly as claimed in claim 1, wherein said harness fastener of the inner member includes fastener protrusions to engage with a protector tube of the wiring harness.

6. The feeder assembly as claimed in claim 1, wherein said harness outlet of the inner member includes tapered walls for regulating swing angle of electric cables of the wiring harness.

7. The feeder assembly as claimed in claim 1, wherein said wiring harness is led out from a second feeder assembly of a moving structure and led into the case through the opening.

* * * * *